United States Patent
Simpson et al.

(10) Patent No.: US 6,612,952 B1
(45) Date of Patent: Sep. 2, 2003

(54) BLADE TENSIONER HAVING SPRING BLADE CANTILEVERED FROM DISTAL END OF ARM

(75) Inventors: Roger T. Simpson, Ithaca, NY (US); Michael C. Duffield, Willseyville, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 09/429,401

(22) Filed: Oct. 28, 1999

(51) Int. Cl.[7] ............................................. F16H 7/08
(52) U.S. Cl. ......................... 474/111; 474/135; 474/140
(58) Field of Search .................................... 474/101, 109, 474/111, 135, 140

(56) References Cited

U.S. PATENT DOCUMENTS

| | | | |
|---|---|---|---|
| 4,921,472 A | 5/1990 | Young | 474/111 |
| 5,045,032 A | 9/1991 | Suzuki et al. | 474/140 |
| 5,055,088 A | 10/1991 | Cradduck et al. | 474/111 |
| 5,184,983 A * | 2/1993 | Shimaya et al. | 474/111 |
| 5,266,066 A | 11/1993 | White | 474/111 |
| 5,318,482 A * | 6/1994 | Sato et al. | 474/111 |
| 5,462,493 A | 10/1995 | Simpson | 474/111 |
| 5,653,652 A | 8/1997 | Simpson | 474/110 |
| 5,662,540 A | 9/1997 | Schnuepke et al. | 474/111 |
| 5,702,318 A | 12/1997 | Hayafune et al. | 474/111 |
| 5,813,935 A | 9/1998 | Dembosky et al. | 474/111 |
| 5,853,341 A | 12/1998 | Wigsten | 474/140 |
| 5,984,815 A * | 11/1999 | Badderia | 474/111 |
| 6,155,941 A * | 12/2000 | White et al. | 474/110 |

FOREIGN PATENT DOCUMENTS

| | | | |
|---|---|---|---|
| EP | 0 867 600 A2 | 9/1998 | |
| EP | 1 070 875 A2 | 1/2001 | |
| GB | 505746 * | 5/1939 | 474/111 |
| JP | 5 713 055 | 2/1982 | |

* cited by examiner

Primary Examiner—Thomas R. Hannon
Assistant Examiner—Vicky A. Johnson
(74) Attorney, Agent, or Firm—Greg Dziegielewski; Fitch, Even, Tabin and Flannery

(57) ABSTRACT

A chain tensioner (10) is disclosed which includes a tensioner arm (18), a face (30) and a blade spring (36). The face and blade spring each have portions which extend beyond a distal end (22) of the tensioner arm. The blade spring maintains contact between the face and a chain (16) as the chain wears.

23 Claims, 3 Drawing Sheets

BLADE TENSIONER HAVING SPRING BLADE CANTILEVERED FROM DISTAL END OF ARM

BACKGROUND OF THE INVENTION

Most modern engines are equipped with overhead camshafts for improved fuel economy and increased power. Commonly, the crankshaft of the engine will drive the camshaft through a chain interconnecting a gear on the crankshaft and a gear on the camshaft. It is common to have one or more guides to guide the chain and at least one tensioner.

One way to improve the fuel economy of an engine is to reduce the friction of the moving components and also to reduce the mass and inertia of the moving parts. However, this reduction in friction cane come with an increase in torsionals of both the camshaft and crankshaft. These torsionals can cause the free strand of the chain between the crank and tensioner arm system to vibrate and flap as it enters the tension arm or guide. This flapping can cause excessive wear on the face of the tension arm system in contact with the chain. This face is generally formed of plastic.

What is needed is a chain tensioner apparatus that will eliminate these concerns and reduce wear on the apparatus components.

SUMMARY OF THE INVENTION

The present invention is directed to an apparatus for applying a continuous tension to a chain. The apparatus includes a tensioner arm having a distal end. A face is secured to the tensioner arm and has a portion that extends beyond the distal end of the tensioner arm. A blade spring is secured to the tensioner arm and also has a portion extending beyond the distal end. The blade spring urges the face into contact with a chain. A hydraulic tensioner urges the tensioner arm against the chain.

DESCRIPTION OF THE INVENTION

Figure 1:
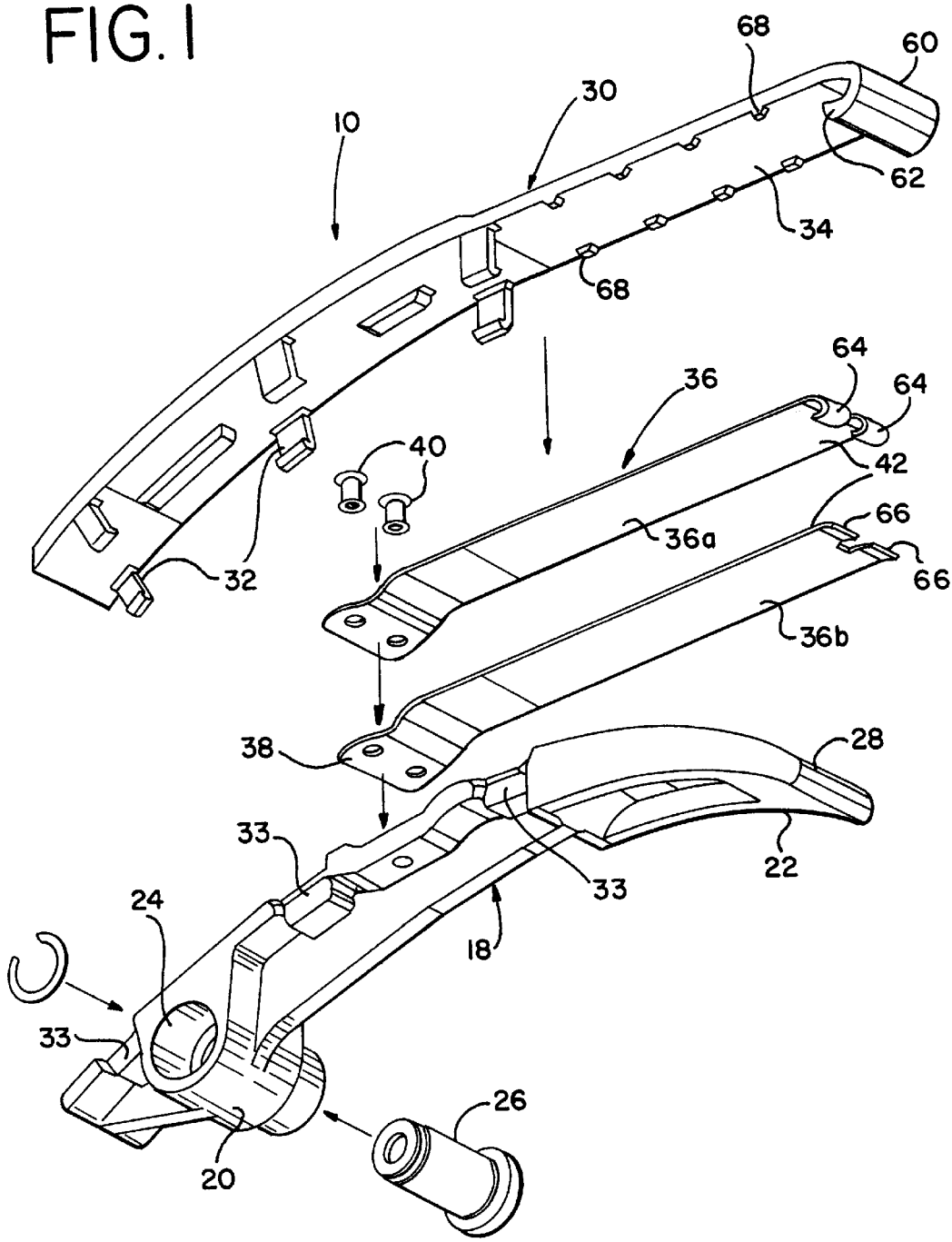
FIG. 1 is an exploded view of a chain tensioner forming a first embodiment of the present invention.
Figure 2:
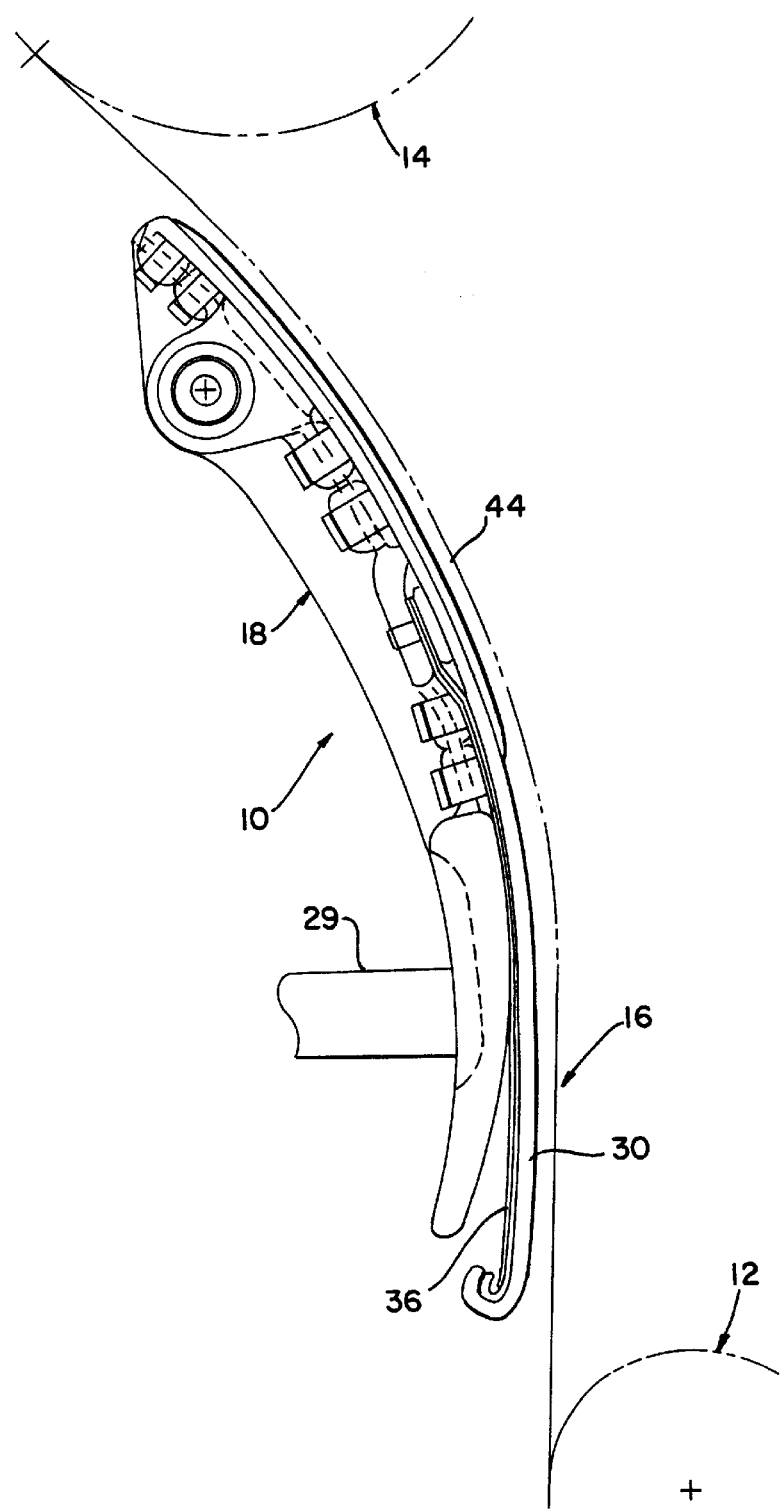
FIG. 2 is a side view of the chain tensioner in operation with a relatively new chain.
Figure 3:
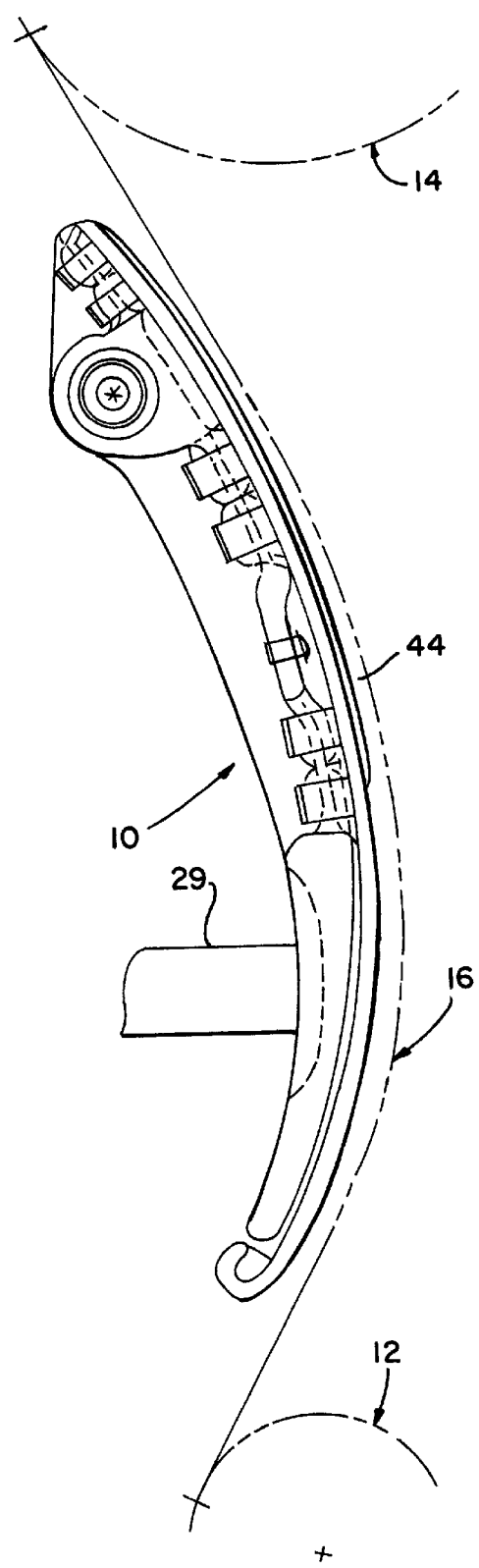
FIG. 3 is a side view of the chain tensioner with a worn chain.

With reference to FIGS. 1–3, there is illustrated a chain tensioner 10 forming a first embodiment of the present invention. The chain tensioner 10 is illustrated as used within an engine having a crankshaft gear 12 used to rotate a camshaft gear 14 through a chain 16. As will be described, the chain tensioner 10 maintains a relatively constant tension in the chain 16 to eliminate chain flapping and reduce wear within the system.

The chain tensioner 10 includes a tensioner arm 18. The tensioner arm 18 has a pivot end 20 and a distal end 22. The pivot end 20 has a passage 24 to accept a pin 26 to secure the tensioner arm 18 to the engine block or other structure, permitting the tensioner arm 18 to pivot about the center axis of the passage 24. The tensioner arm defines a surface 28 facing the chain 16 which has a curvature which decreases in radius from the pivot end 20 to the distal end 22. A hydraulic tensioner 29 (FIGS. 2 and 3), or other suitable mechanism, acts on the tensioner arm 18 near distal end 22 to pivot the arm about pivot end 20 and force the arm into engagement with the chain 16.

A face 30, preferably formed of plastic, is snap fit onto the tensioner arm 18 through the use of snaps 32 on the face 30 that are received in formed insets 33 on arm 18. A distal portion 34 of the face 30 extends beyond the distal end 22 of the tensioner arm 18 in a cantilevered manner. The distal end 60 of the face 30 ends in a book 62 curved away from the chain.

A spring blade 36, preferably formed of metal, is riveted at a first end 38 to the tensioner arm 18 by rivets 40. As can be seen, the spring blade is made up of two portions, 36a and 36b. The spring blade 36 extends to a distal end 42 which also extends past the distal end 22 of the tensioner arm 18 toward the crank or cam sprocket. The blade portion 36a ends with hooks 64 which engage extensions 66 on blade portion 36b to ensure the free ends of portions 36a and 36b move together. The distal end 42 of the spring blade 36 engages the distal portion 34 of the face 30 with hooks 64 received in hook 62 to support the face. Ribs 68 extending from face 30 help center spring blade 36 therebetween.

When the chain tensioner 10 is initially assembled into the engine with a new chain 16, as illustrated in FIG. 2, forcing the chain tensioner against the chain 16 with hydraulic tensioner 29 will cause the face 30 and spring blade 36 to bend slightly, thus keeping pressure on the free strand 44 of the chain 16 at all times.

As the chain wears, and lengthens, increasing the length of the free strand 44 between the camshaft and crankshaft, the tensioner arm 18 will engage the free strand 44 along substantially its entire length, as seen in FIG. 3. The forcing of the chain tensioner against chain 16 with hydraulic tensioner 29 will cause the face 30 and spring blade 36 to bend along the arm radius while still maintaining force on the free strand of the chain. The blade 36 thus adds further extension or curvature beyond the limit of the hydraulic tensioner.

The chain tensioner 10 of the present invention helps guide the chain 16 as it enters the arm face 30 or guide by applying a force to the free strand and preventing the chain from flapping. This flapping can cause excessive wear on the plastic faces in the chain tensioner and other chain guides.

While a certain embodiment of the apparatus of the present invention has been presented, it is appreciated that the invention is not limited thereto. Many variations, substitutions and amendments can be made to this embodiment without departing from the scope of the invention. Such variations, substitutions, and amendments as would be apparent to one having ordinary skill in the art who would be familiar with the teaching disclosed herein are also deemed to fall within the scope and spirit of the present invention as hereafter claimed.

What is claimed is:

1. An apparatus for applying a continuous tension to chain, the apparatus comprising:
   a tensioner arm having a distal end;
   a face secured to the tensioner arm having a first portion extending beyond the distal end of the tensioner arm and movable away from the distal end of the tensioner arm;
   at least two blade springs secured relative to the tensioner arm and having end portions extending beyond the distal end of the tensioner arm, the blade springs urging the first portion of the face in the first direction into contact with a chain, one of the blade springs having a stop and another of the blade springs having a contact surface disposed to engage the blade stop when the face moves toward the tensioner arm to limit relative movement between the blade springs.

2. The apparatus of claim 1 wherein the tensioner arm has a pivot end, a radius of a portion of the tensioner arm facing the chain decreasing between the pivot end and the distal end.

3. The apparatus of claim 1 wherein the blade spring maintains the face in engagement with the chain as the chain wears.

4. The apparatus of claim 1 wherein the face is formed of plastic.

5. The apparatus of claim 4 wherein the face has snaps formed thereon to snap onto the tensioner arm.

6. The apparatus of claim 1 wherein the face has a distal end, the distal end being curved into a hook shape.

7. The apparatus of claim 1 wherein the blade spring stop is a hook on the blade spring end portion.

8. The apparatus of claim 7, wherein the other blade spring has a distal end that is inserted into the hook of the one blade spring, engagement of the hook with the other blade spring distal end limiting relative movement between the distal ends of the blade springs.

9. The apparatus of claim 1, wherein the blade stop is disposed on a distal end of the one blade spring and the contact surface is disposed on a distal end of the other blade spring.

10. The apparatus of claim 1, wherein the blade stop and the blade contact surface allow relative movement between the blade springs when the face moves away from the tensioner arm.

11. The apparatus of claim 1 wherein each of the face and the blade springs have a distal end, and the distal end of each of the face and the one blade spring forming a hook, the hooks of the face and the one blade spring being engaged.

12. The apparatus of claim 1 further comprising a hydraulic tensioner acting on the distal end of the tensioner arm.

13. An apparatus for applying a continuous tension to chain, the apparatus comprising:
 a tensioner arm having a distal end and a proximate end;
 a face secured relative to the proximate end of the tensioner arm and having a portion extending beyond the distal end of the tensioner arm;
 a blade spring formed of a first blade spring portion and second blade spring portion, said blade spring being secured relative to the proximate end of the tensioner arm, said first and second blade spring portions extending beyond the distal end of the tensioner arm, the blade springs urging the portion of the face from the distal end of the tensioner arm and into contact with a chain, and a stop disposed between the first and second blade spring portions restricting relative movement therebetween when the face moves toward the tensioner arm.

14. The apparatus of claim 13 wherein the face has a distal end ending in a hook and said first blade spring portion has a distal end forming a hook, the hooks being engaged.

15. The apparatus of claim 13 wherein said first blade spring portion has a distal end forming at least one hook and the second blade spring portion has a distal end forming at least one extension, each of said extensions received in one of said hooks.

16. The apparatus of claim 13 wherein the face is snap fit to the tensioner arm by a plurality of snaps on the face, the face further having a plurality of ribs extending therefrom to the center the blade spring relative the face.

17. The apparatus of claim 13 further comprising a hydraulic tensioner action on the distal end of the tensioner arm.

18. An apparatus for applying tension to at least one strand of a chain, the apparatus comprising:
 a tensioner arm having a first end and a second end, the tensioner arm pivotable about the first end;
 a face having a first portion and a second portion, the first portion secured relative to the first end of the tensioner arm and the second portion unsecured relative to the second end of the tensioner arm; and
 a spring member secured relative to the tensioner arm at a spring securement location disposed between the first and second ends thereof and unsecured relative to the second end of the tensioner arm, the spring member cantileverly extending from the tensioner arm effective to bias the second portion of the face away from the second end of the tensioner arm against the chain strand, the face being secured relative to the tensioner arm between the spring securement location and the second end of the tensioner arm.

19. The apparatus of claim 18 wherein the spring member comprises a blade spring with a spring force effective to reduce vibrational movement of the chain strand as the strand contacts the second portion of the face.

20. The apparatus of claim 18 wherein a biasing source operatively connected to the tensioner arm urges the tensioner against the chain strand.

21. The apparatus of claim 20 wherein the biasing source comprises a hydraulic tensioner.

22. An apparatus for applying a continuous tension to chain, the apparatus comprising:
 a tensioner arm having a distal end;
 a face secured to the tensioner arm and having a portion extending beyond the distal end of the tensioner arm; and
 a blade spring riveted to the tensioner arm and having a portion extending beyond the distal end of the tensioner arm, the blade spring urging the face into contact with a chain.

23. An apparatus for applying tension to at least one strand of a chain, the apparatus comprising:
 a tensioner arm having a first end and a second end, the tensioner arm pivotable about the first end;
 a face having a first portion and a second portion, the first portion secured relative to the first end of the tensioner arm and the second portion unsecured relative to the second end of the tensioner arm; and
 at least two spring means for biasing the second portion of the face in a first direction away from the second end of the tensioner arm against the chain strand, means for limiting relative movement between the spring means when the second portion of the face moves in a direction opposite the first direction.

* * * * *